US008142549B2

(12) United States Patent
Millward et al.

(10) Patent No.: US 8,142,549 B2
(45) Date of Patent: Mar. 27, 2012

(54) PURIFICATION OF FLUORINE CONTAINING GASES AND SYSTEMS AND MATERIALS THEREOF

(75) Inventors: Andrew Millward, Longmont, CO (US); Joseph V. Vininski, Boulder, CO (US); Robert Torres, Jr., Parker, CO (US); Tadaharu Wantanbe, Superior, CO (US); Carrie L. Wyse, Longmont, CO (US); Mark Raynor, Longmont, CO (US); Dan Davia, Longmont, CO (US); Praveen Jha, Longmont, CO (US)

(73) Assignee: Matheson Tri-Gas, Inc., Basking Ridge, NJ (US)

( * ) Notice: Subject to any disclaimer, the term of this patent is extended or adjusted under 35 U.S.C. 154(b) by 186 days.

(21) Appl. No.: 12/411,646

(22) Filed: Mar. 26, 2009

(65) Prior Publication Data

US 2009/0249953 A1  Oct. 8, 2009

Related U.S. Application Data

(60) Provisional application No. 61/039,725, filed on Mar. 26, 2008.

(51) Int. Cl.
  *B01D 53/02*  (2006.01)
(52) U.S. Cl. .................. 95/118; 95/90; 95/117; 95/131; 95/133; 96/108
(58) Field of Classification Search ............ 95/90, 117, 95/118, 131, 133; 96/108
See application file for complete search history.

(56) References Cited

U.S. PATENT DOCUMENTS

| | | | |
|---|---|---|---|
| 4,244,710 A | 1/1981 | Burger | |
| 4,853,148 A | 8/1989 | Tom et al. | |
| 5,252,259 A | 10/1993 | Hardwick | |
| 6,033,460 A | 3/2000 | Snow | |
| 6,395,070 B1 | 5/2002 | Bhadha et al. | |
| 6,547,861 B2 | 4/2003 | Funke et al. | |
| 6,709,482 B2 | 3/2004 | Funke et al. | |
| 6,709,487 B1 | 3/2004 | Dong et al. | |
| 6,783,576 B2 | 8/2004 | Funke et al. | |
| 6,790,358 B2 | 9/2004 | Torres, Jr. et al. | |
| 6,911,065 B2 | 6/2005 | Watanabe et al. | |
| 2002/0044334 A1 | 4/2002 | Battilana et al. | |
| 2006/0226074 A1 | 10/2006 | Wyse et al. | |

OTHER PUBLICATIONS

PCT International Search Report and Written Opinion mailed Nov. 18, 2009, International Application No. PCT/US09/38373, 13 pages.

*Primary Examiner* — Robert J Hill, Jr.
*Assistant Examiner* — Christopher P Jones
(74) *Attorney, Agent, or Firm* — Kilpatrick Townsend & Stockton LLP

(57) ABSTRACT

A method of reducing moisture in a fluorine-containing gas is described. The method may include the steps of providing a purifier material that includes elemental carbon, and flowing the unpurified fluorine-containing gas having an unpurified moisture concentration over or through the carbon-based purifier material. At least a portion of the moisture is captured in the purifier material so that a purified fluorine-containing gas that emerges downstream of the purifier material has a reduced moisture concentration that is about 50% or less of the unpurified moisture concentration.

29 Claims, 3 Drawing Sheets

100

PURIFICATION OF FLUORINE CONTAINING GASES AND SYSTEMS AND MATERIALS THEREOF

CROSS-REFERENCES TO RELATED APPLICATIONS

This application claims the benefit of U.S. Provisional Application No. 61/039,725 by Millward et al, filed Mar. 26, 2008, and titled "PURIFICATION OF FLUORINE CONTAINING GASES AND SYSTEMS AND MATERIALS THEREOF." The entire contents of the U.S. Provisional patent application is herein incorporated by reference for all purposes.

BACKGROUND

Fluorine-containing gases, including molecular fluorine, hydrogen fluoride, nitrogen trifluoride, etc., find a variety of uses as etchants and cleaning agents in semiconductor device fabrication processes. As these processes have advanced, the purity requirements of the process gases used has increased. For example, while older semiconductor fabrication processes could tolerate levels of moisture impurities in hydrogen fluoride in excess of 100 ppm, more recent processes require that moisture level be reduced to 10 ppm or less.

Because fluorine containing process gases are normally highly reactive, it is difficult to store them at high levels of purity for an extended period. Thus, there is a need for purification methods and systems that can purify the fluorine-containing gases as they are flowing between a storage container and the point of use. These and other problems are addressed by embodiments of the present invention.

BRIEF SUMMARY

Embodiments of the invention include methods of reducing moisture in a fluorine-containing gas. The methods may include the steps of providing a purifier material which includes elemental carbon, and flowing an unpurified fluorine-containing gas having an unpurified moisture concentration over or through the carbon-based purifier material. The carbon-based purifier material captures a portion of the moisture in the purifier material so that a purified fluorine-containing gas emerges downstream of the purifier material with reduced moisture concentration about 50% or less of the unpurified moisture concentration.

Embodiments of the invention also include methods or making a purified fluorine-containing gas. The methods may include the steps of contacting an unpurified hydrogen fluoride or molecular fluorine gas with a carbon-based purifier material which includes elemental carbon, and capturing a portion of water vapor or a metal-containing impurity in the unpurified gas such that the purified hydrogen fluoride or molecular fluorine gas has a water vapor or metal-containing impurity concentration that is about 50% or less than the unpurified gas.

Embodiments of the invention still further include methods for making a purified fluorine-containing gas. The methods may include the steps of contacting an unpurified fluorine-containing gas with a carbon-based purifier material comprising elemental carbon, and capturing an impurity in the unpurified gas such that the purified fluorine-containing gas has a concentration of the impurity that is about 50% or less than the unpurified gas.

Embodiments of the invention further include methods of reducing moisture in a flow of hydrogen fluoride gas. The methods may include the steps of heating a bed of microporous charcoal beads in a dry environment to activate the bed, and flowing unpurified hydrogen fluoride gas, having a unpurified moisture concentration, through the activated bed of charcoal beads so that a portion of the moisture in the hydrogen fluoride gas is captured by the bed. A purified hydrogen-fluoride gas emerging from the bed has a reduced moisture concentration that is about 5% or less of the unpurified moisture concentration.

Embodiments of the invention still further include systems for in-situ generation of a purified fluorine-containing gas. The systems may include an unpurified fluorine-containing gas containing moisture and/or a metal-containing impurity, where the unpurified fluorine-containing gas is directed by an inlet conduit to a carbon-based purifier material. The systems may further include the carbon-based purifier material containing elemental carbon, and contained in a purification unit that is fluidly coupled to the inlet conduit. The carbon-based purifier material removes at least a portion of the moisture and/or the metal-containing impurity from the unpurified fluorine-containing gas. The systems may also include an outlet port formed in the purification unit through which the purified fluorine-containing gas exits the purification unit. The purified fluorine-containing gas has a reduced moisture and/or metal-containing impurity concentration that is about 50% or less of the unpurified moisture concentration.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

DETAILED DESCRIPTION

Methods and systems are described for purifying fluorine-containing gases with purifier materials that contain carbon. The carbon may be one or more allotropes of elemental carbon, such as amorphous carbon in the form of activated carbon, charcoal, activated charcoal, carbon black, soot, and/or coal, among other allotropes of elemental carbon. The carbon may also be an allotrope of elemental carbon having longer range order, such as particles of graphite, graphene, carbon nanotubes, and/or fullerenes, among other allotropes of elemental carbon.

The carbon-based purifier material may be used alone or in combination with additional purifier materials to remove one or more impurities from the fluorine-containing gases, including moisture and/or other impurities. Traditionally, carbon-based purifier materials have not been used to remove moisture from halogen gases, but these purifier materials are effective to remove low concentrations of moisture (e.g., 500 ppm or less) increasingly required for fluorine-containing gases used in precision microelectronics fabrication applications. When extremely low levels of moisture impurities in the fluorine-containing gas are required, the carbon-based purifier materials may be prepared as ultra-low emission (ULE) carbon, which is sufficiently dehydrated to display hydrophilic properties, and can reduce moisture impurities in a fluorine-containing gas without concurrently emitting water vapor back into the purifying gas.

Figure 1:
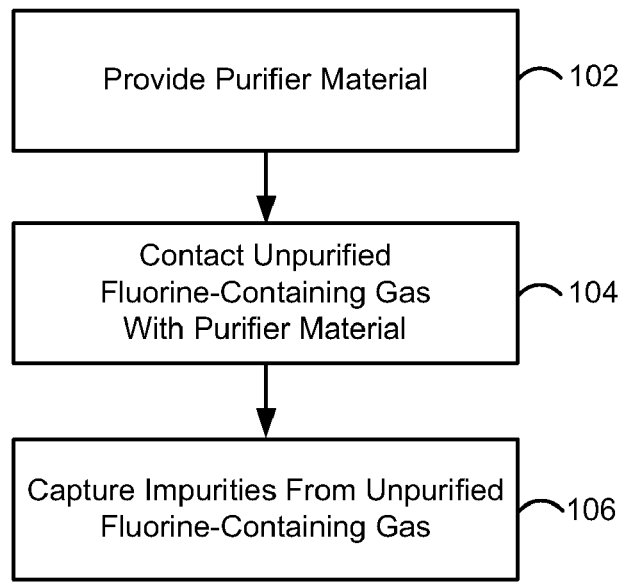
FIG. 1 is a flowchart showing selected steps in methods of reducing one or more impurities in a fluorine-containing gas according to embodiments of the invention.

FIG. 1 shows a flowchart with selected steps in a method 100 of reducing one or more impurities in a fluorine-containing gas according to embodiments of the invention. The method 100 includes the step of providing a purifier material that includes elemental carbon 102. As noted above, the term elemental carbon refers to one or more allotropes of solid phase carbon, such as activated carbon, charcoal, carbon black, powdered graphite, etc. For example, the purifier material may be made primarily or exclusively of a microporous carbon, such as microporous charcoal. In addition to elemental carbon, carbon-based purifier material may include organic-based carbon (e.g., substituted and unsubstituted hydrocarbons), and organic polymers, including fluorinated polymers.

The carbon-containing purifier material may be made of substantially homogeneous particles, or they may be dispersed as powders or coatings on high surface area support materials. The particles can be shaped, extruded, compacted, or formed into various forms, which may include without being limited to pellets, spheres, irregular-shaped extrudates, and variable-shaped extrudates, among other forms. The purifier materials may also be layered particles comprising an outer layer of a first material and a particle interior made of a second material, with one or both layers containing carbon. Embodiments may also include a plurality of layers surrounding the particle interior with one or more of the layers containing carbon.

The elemental carbon may be provided in a conditioned state. This may include dried carbon which has been exposed to a dry gas stream (e.g., a flow of an inert gas such as helium, nitrogen, argon, or mixtures of inert gases) under moderate to high temperatures (e.g., temperatures ranging from about 100° C. to about 1000° C.). In some embodiments, the conditioned state may also include exposure of the elemental carbon to a pure or diluted stream of molecular fluorine gas ($F_2$) in addition to (or in lieu of) other conditioning steps.

The term elemental carbon does not require the complete absence of other elements. Carbon-containing purifier materials made from elemental carbon may include minor amounts of additional elements, including oxygen, nitrogen, hydrogen, and metals, that have not been completely removed from the purifier. These additional elements may be unreacted with the bulk elemental carbon, or may have reacted to form compounds in the elemental carbon (e.g., oxidized carbon).

Conditioned carbon-containing purifier materials may include ultra-low-emission (ULE) carbon materials which have been sufficiently dehydrated to display hydrophilic properties that can further reduce concentrations of moisture and other impurities without emitting water vapor back into the purifying fluid (i.e., gas or liquid). Materials used to make ULE carbon may include commercially available activated carbon, such as high-hardness carbon beads sold by Advanced Technology Materials, Inc., of Danbury, Conn. The stock material is conditioned in an ultra-dry atmosphere at a sufficient temperature and time to reduce the level of moisture in the material less than about 1 part-per-billion (ppb). The dried product is referred to as ULE carbon due to its extremely low emissions of moisture during purification. Additional details on the types of materials and process conditions used to make ULE carbon can be found in co-assigned U.S. Pat. No. 6,709,482, to Funke et al, issued Mar. 23, 2004, and titled "METHOD FOR REDUCING TRACE IMPURITIES FROM A REACTIVE FLUID USING PRECONDITIONED ULTRA-LOW EMISSION CARBON MATERIAL" the entire contents of which is herein incorporated by reference for all purposes.

Additional, non-carbon containing purifier materials may be used with the carbon-containing purifier material. These additional materials may include metal fluoride materials, such as alkali metal fluorides (e.g., lithium fluorides, sodium fluorides, potassium fluorides), alkali-earth metal fluorides (e.g., beryllium fluorides, magnesium fluorides, calcium fluorides, strontium fluorides, barium fluorides), aluminum fluorides, and transition metal fluorides (e.g., cadmium fluorides, nickel fluorides, iron fluorides, zinc fluorides, cobalt fluorides, zirconium fluorides, etc.). They may also include poly-metallic fluorides such as potassium-nickel fluorides (e.g., $K_2NiF_6$). Because these materials have already fully reacted with fluorine, they are less prone to reacting with the fluorine-containing gas and creating additional impurities. Additional, non-carbon containing purifier materials may also include chemical and physical sorbents such as zeolites, porous alumina, silica gel, alkali metal oxides, alkali-earth metal oxides, metals, and metal alloys, among other purifier materials.

Method 100 may also include the step of flowing an unpurified fluorine-containing gas over or through the carbon-based purifier material 104. The unpurified fluorine-containing gas may include hydrogen fluoride (HF) and/or molecular fluorine ($F_2$) gas. Semiconductor manufacturers are demanding increasingly high purity levels of HF and $F_2$ for semiconductor fabrication processes such as wafer etching and chamber cleaning. Thus, method 100 may be used to produce high purity HF and $F_2$ (e.g., purity of 99.9%, 99.99%, 99.995%, etc.) at the time and point-of-use by these processes.

The terms "purified" and "unpurified" fluorine-containing gas are relative and may refer to a fluorine-containing gas that has been previously purified, but can undergo additional purification using the methods and systems described here. For example, a fluorine-containing gas purified to 99.9% or higher purity may be considered an "unpurified" gas when it contacts the above-described purifier materials which reduce the concentration of one or more impurities in the gas even further. Similarly, a "purified" fluorine-containing gas produced by the presently described methods and systems may be considered an "unpurified" gas when making contact with the same purifier material again, or making contact with a different purifier material downstream from the first purifier material.

The unpurified fluorine-containing gas may also include one or more of tungsten hexafluoride ($WF_6$), silicon fluoride ($SiF_4$), nitrogen trifluoride ($NF_3$), and hydrogen fluoride (HF), $BF_3$, $SiHF_3$, $SiH_2F_2$, $SF_6$, $SF_4$, $AsF_5$, $GeF_4$, $GeHF_3$, $PF_3$, $BrF_5$, $BrF_3$, $BrF$, $C_2BrF_3$, $CF_4$, $CF_2O$, $CHClF_2$, $C_2ClF_5$, $C_2ClF_3$, $CClF_3$, $CBr_2F_2$, $C_2Br_2F_4$, $CCl_2F_2$, $CHCl_2F$, $C_2Cl_2F_4$, $C_2H_3ClF_2$, $C_2H_4F_2$, $C_2H_2F_2$, $CH_2F_2$, $C_3F_6O$, $C_2F_6$, $C_2F_4$, $C_3F_6$, IF, $IF_3$, $IF_5$, $IF_7$, $CH_3F$, $C_4F_8$, $C_4F_8O$, $C_5F_8$, $F_2O$, $C_2H_5F$, $ClFO_3$, $ClF_3$, $ClF_5$, ClF, $C_4F_{10}$, $C_3F_8$, $SO_2F_2$, $C_2F_4$, $N_2F_4$, $CCl_3F$, $C_2Cl_3F_3$, $CHF_3$, $C_2H_3F$, $XeF_2$, $SnF_4$, $SnF_2$, NOF, $NClF_2$, $NFCl_2$, $F_2O$, $C_3F_6O$, $F_2O_2S$, $S_2F_{10}$, $SbF_5$, $UF_6$, $UF_4$, $UF_2$, $MoF_6$, $AsF_3$, $CF_3GeI_3$, $CH_3GeF_3$, $(CH_3)_3GeF$, $(CF_3)_3GeI$, $(C_2H_5)_3CF_3Si$, $(CH_3)_3CF_3Si$, and fluorocarbons such as halocarbons 116, 1216, 14, 218, 23, 32, 41, 4110, C318, among other fluorine-containing gases.

The unpurified fluorine-containing gases include moisture ($H_2O$) as an impurity. They may also include additional impurities, including metal containing contaminants such as volatile and non-volatile metal fluorides, and halogen containing contaminants such as hydrogen chloride (HCl), hydrogen bromide (HBr), and boron trichloride ($BCl_3$), among other types of fluorinated and chlorinated impurities. The additional impurities may further include oxygen-containing compounds, such as molecular oxygen ($O_2$), carbon monoxide (CO), carbon dioxide ($CO_2$), among others. Impurities may also include fluorine-containing gases when they are not the gas being purified. For example, hydrogen fluoride (HF), sulfur hexafluoride ($SF_6$), silicon tetrafluoride ($SiF_4$), nitryl fluoride ($FNO_2$), sulfuryl difluoride ($SO_2F_2$), carbonyl fluoride ($COF_2$), and fluorinated hydrocarbons such as tetrafluoromethane ($CF_4$), hexafluoroethane ($C_2F_6$), and trifluoromethane ($CHF_3$), among other fluorine-containing gases, may be impurities to be removed from other fluorine-containing gases.

Method 100 may further include capturing a portion of the impurities (e.g., moisture, metals, etc.) from the unpurified fluorine-containing gas in the purifier material 106. When the impurities include moisture, the amount of moisture captured may be such that the concentration of moisture in the purified fluorine-containing gas is about 50 mol. % or less than the unpurified moisture concentration. In further examples, the moisture content may be reduced to about 15 mol. % or less, about 5 mol. % or less, about 2 mol. % or less, about 1 mol. % or less, about 0.5 mol. % or less, about 0.1 mol. % or less, about 0.01 mol % or less, etc., than the unpurified moisture concentration. In terms of absolute concentration of moisture in the fluorine-containing gas, the moisture levels may be reduced from about 10,000 ppm-1 ppm in the unpurified gas to less than about 1 ppm in the purified gas (e.g., about 50 ppb or less).

When the impurities include metal-containing compounds (e.g., halogenated metals), the amount of the metal-containing compounds captured may be such that the concentration of metal concentration in the purified fluorine-containing gas is about 50 mol. % or less than the unpurified metal concentration. In further examples, the metal content may be reduced to about 15 mol. % or less, about 5 mol. % or less, about 2 mol. % or less, about 1 mol. % or less, about 0.5 mol. % or less, about 0.1 mol. % or less, about 0.01 mol % or less, etc., than the unpurified metal content. In terms of absolute concentration of metal-containing impurities in the fluorine-containing gas, the metal impurities levels may be reduced from about 10,000 ppm-1 ppm in the unpurified gas to less than about 1 ppm in the purified gas (e.g., about 50 ppb or less).

Figure 2:
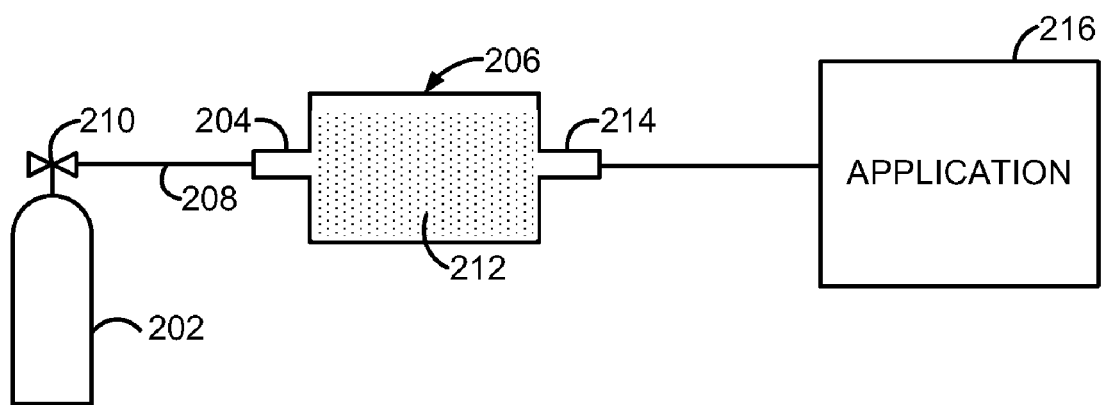
FIG. 2 is a simplified schematic diagram showing selected components in a system for the in-situ generation of a purified fluorine-containing gas according to embodiments of the invention.

Referring now to FIG. 2, a simplified schematic diagram showing selected components in a system 200 for the in-situ generation of a purified fluorine-containing gas according to embodiments of the invention is shown. The system 200 may include a source of unpurified fluorine-containing gas 202. This source 202 may include a storage vessel (e.g., a high-pressure storage cylinder) holding the unpurified fluorine-containing fluid (e.g., neat hydrogen fluoride). The unpurified fluid from source 202 is directed to an inlet 204 of the purification unit 206 by a leak tight fluid conduit 208. The rate of unpurified fluid supplied to the purification unit may be controlled by a flow control device 210, such as a pressure regulator, mass flow controller, etc.

The unpurified fluid entering inlet 204 makes contact with the purifier material 212 held inside the purification unit 206. As noted above, the purifier material 212 may include a carbon-based comprising elemental carbon. It may also include one or more non-carbon-based purifier materials that are mixed with the carbon-based purifier. For example, the purifier material 212 may include a mixture of microporous charcoal and one or more metal fluorides.

The purification unit 206 may also include an outlet port 214 through which the purified fluorine-containing gas exits the unit. The purified fluorine-containing gas emerging from the purification unit 206 may have a reduced concentration of one or more impurities that is about 50 mol. % or less, 15 mol. % or less, 5 mol. % or less, etc., of the unpurified impurity concentration. Specific examples of the impurities removed from the purified fluorine-containing gas may include, moisture, metal impurities such as volatile metal fluorines, and halogen impurities such as hydrogen chloride (HCl), hydrogen bromide (HBr), boron trichloride ($BCl_3$), carbon monoxide (CO), carbon dioxide ($CO_2$), molecular oxygen ($O_2$), and halogenated or non-halogenated hydrocarbons, among other impurities.

System 200 may also include an application 216 to which the outlet port 214 of the purification unit 206 is coupled. The application 216 may be in close proximity (e.g., same room, same building, same site, etc.) as system 200 so that the purified fluorine-containing gas is provided in-situ to the application when needed. Examples of applications 216 may include semiconductor fabrication systems among other applications.

In additional embodiments (not shown), a carbon-based purifier material may be physically separated from other purifier materials in the purification unit 206. For example, the purification unit 206 may be partitioned into separate, fluidly communicating compartments, each of which stores a different purifier material. The unpurified fluorine-containing fluid may flow from inlet 204 into a first compartment that contains a non-carbon based purifier material that reduces the concentration of moisture (and possibly other impurities) from in initial level (e.g., about 1 ppm to about 10,000 ppm) to a reduced level (e.g., about 1 ppm or less). The partially purified gas then flows to a second compartment in the purifier unit 206 that contains a carbon-based purifier material that further reduces the moisture concentration, and possibly other impurities as well. Such partitioned purifier units may contain a plurality of compartments that hold purifier material. They may be separated by mesh screens, check valves, etc., that permit fluids to flow from one compartment to another while maintaining a physical separation between the solid purifier materials.

Experimental

Purifier methods and systems are tested to measure their effectiveness at removing impurities such as water vapor (i.e., moisture) from fluorine-containing gases such as neat hydrogen fluoride. The purifiers are assembled with various purifier materials and challenged with HF containing ppm levels of water. The purifier materials tested may include anhydrous aluminum fluoride, dehydrated aluminum fluoride trihydrate, calcium fluoride, Drierite, elemental carbons, magnesium fluoride, zirconium fluoride, potassium hexafluoronickelate, lithium fluoride and nickel fluoride. In some examples, a carbon-based purifier material is used in combination with other purifier materials that contain little or no carbon. In still other comparative examples, the non-carbon based purifier material is used exclusively to purify the fluorine-containing gases.

The carbon-based purifier materials include commercially available sources of microporous activated carbon (i.e., charcoal) with an average size of, for example, about 0.0625 inches and surface area of about 1000 $m^2/g$. In some instances, the carbon-based purifier materials are conditioned before use in a purification system by, for example, being exposed to a stream of a low-moisture, non-reactive gas such as dry nitrogen ($N_2$). Non-carbon based purifier materials may include commercially available chips of anhydrous calcium sulfate ($CaSO_4$) with an average size of about 0.125 inches. They may also include porous alumina beads, doped with oxides and hydroxides of cesium, with an average size of about 0.125 inches, and extrudates of porous, high-silicon zeolite with an average size of about 0.125 inches. Still other examples of non-carbon based purifier materials include extrudates of a fluoropolymer with sulfonic acid side groups that have an average size of about 0.125 inches.

The non-carbon based purifier materials may also include inorganic metal fluorides. The metal fluoride may start as powders that are pressed into pellets, followed by crushing to obtain 1 to 2 mm-sized pieces or smaller. The pressed pellets may include anhydrous $AlF_3$, $K_2NiF_6$, LiF, $MgF_2$, $CaF_2$, $NiF_2$ and $ZrF_4$, which may be sieved to select sizes between 150 and 425 μm. Surface areas for dehydrated $AlF_3 \cdot 3H_2O$, anhydrous $AlF_3$, $MgF_2$, $CaF_2$ and LiF purifier media were found to be 77, 45, 42, 10, and 8 $m^2/g$ respectively.

In the case of the aluminum fluoride, attempts may be made to fluorinate the aluminum oxide in an HF stream while purging away the resulting water. The purpose is to retain the high surface area of the material while rendering it chemically inert to HF. The resulting purifier material has a surface area of 38 $m^2/g$.

Purification units are assembled and loaded with the candidate purifier materials. Purification containers are constructed of stainless steel tubes fitted with isolation valves and 60 micron filter gaskets on both ends. Most often the size is ½"×12", but where more material is available a larger 1" or 2" purifier may be used. Heat and $N_2$ purging are used in concert to dry and condition the purification materials. Purification units are filled ¾ full with purifier material to allow space to preheat the purge $N_2$. Heating profiles with generally 1 LPM of purified $N_2$ flow.

Figure 3:
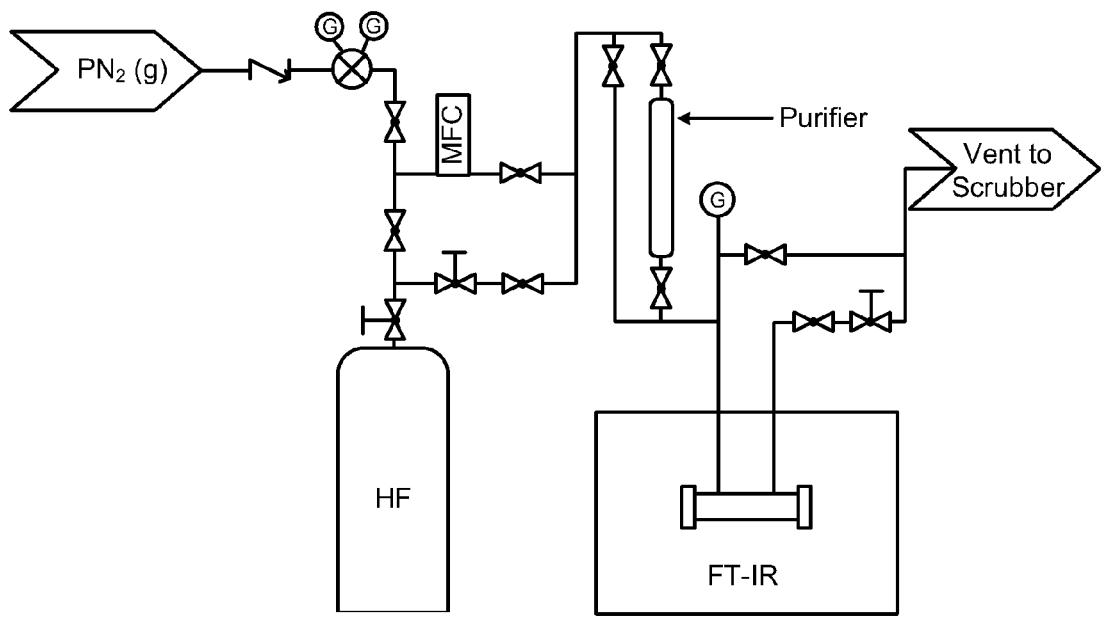
FIG. 3 is a schematic drawing of a purifier testing system.

The performance of the purification units are evaluated in an FT-IR system using an appropriate quantification method. The purification units are installed in the testing system diagramed in FIG. 3 and atmospherics are purged from the system using $N_2$. Heat tracing maintained at 40° C. is applied to the purifier body and surrounding plumbing. The HF cylinder produces variable water concentrations, presumably due to temperature fluctuations. A 35° C. heating tape, and eventually a heating blanket, may be applied to the HF cylinder.

A Nicolet 550 FTIR is equipped with a solid Ni 15 cm path-length cell fitted with $CaF_2$ windows for testing. Heat tracing on the cell is maintained at 100° C. to prevent gas phase hydrogen bonding of HF in the cell, and cell pressure is manually maintained at approximately 760 torr via inlet and outlet needle valves. A water quantification method having an approximate MDL of 2 ppmv and a calibration range of 2-50 ppmv may be established in this testing system using the same parameters. This method can be used throughout the experiments to quantify the moisture in the gas stream.

Testing begins by checking the manifold and purifier respectively for atmospherics using purified $N_2$. Once the system is known to be free of contaminants, HF is introduced into the FT-IR cell via the bypass to establish the water concentration inherent in the HF challenge. Then the HF is diverted through the purifier to measure its ability to remove water.

Baseline water concentrations are established by sending the HF challenge gas through the bypass to the FT-IR. The water baseline is found to be variable both during and between tests, so the water content in the challenge HF is periodically measured during the experiments. The challenge HF is then passed through the purifier and FT-IR to measure the water content in the purifier effluent. The testing includes the use of a permeation tube and the Nicolet 550 FT-IR, D. A method may be developed for water detection in HF (calibrated from 2 to 50 ppm).

Candidate purifier materials vary in their chemical compatibility with HF, as well as their efficiency and capacity for removing water. Some purifier materials had poor to fair compatibility with an HF gas flow and generated some volatile compounds by chemical reaction when exposed to HF, and/or were prone to liquefying. However, these materials may have improved compatibility with other fluorine-containing gases.

Other purifier materials had good compatibility with impure HF gas flows, but the efficiencies of some of these materials are difficult to determine because the measured water concentration level rarely drops below the moisture level in the challenge HF gas. This is the case for $NiF_2$, dehydrated $AlF_3 \cdot 3H_2O$, and $CaF_2$ samples.

After an initial water spike (common to all media tested), the water concentrations from the LiF purifier drops to, and remains at, the level of the challenge HF. This behavior indicates saturation of the LiF media. The carbon-based purifiers have variable water concentrations in the challenge HF, but the effluent seems to follow that concentration after the initial spike.

Potassium hexafluoronickelate has the added benefit of changing color from red to pale yellow when hydrated. Water removal efficiencies are comparable to a larger $AlF_3$ purifier. However, there are uncertainties about longer term compatibility of this material with flows of impure HF gas. A solid white crystalline material starts to deposit in the IR cell after running the challenge HF gas through the $K_2NiF_6$ purifier.

Zirconium fluoride is somewhat reactive with ambient humidity while preparing the purifier material. After the oxide is removed by exposure to HF, the purifier is reactivated. It achieves 80% efficiency after 2.2 hrs which is not a sufficient time to reach breakthrough. Based on the 75% efficiency of the first $AlF_3$ purifier, a larger purifier of smaller $AlF_3$ particles is tested and found to have improved efficiency.

A subset of purifier materials that includes $ZrF_4$ and some carbon-based materials are also tested for the removal of metal impurities. The $ZrF_4$ purifier effectively reduces the levels of Cr, Cu and Zr in the gas flow. It appears to generate S, Ba and W, and to leave the other metals at approximately the same levels inherent in the control experiment. The carbon-based materials are also effective removing an even larger group of metal impurities from the challenge HF gas stream. They substantially removed Na, Mg, Al, P, Ca, Ti, Cr, Fe, Ni, Cu, Zn, Sr, Zr and W, while reducing the concentrations of B and K.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the purifier" includes reference to one or more purifiers and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of reducing moisture in a fluorine-containing gas, the method comprising:
   providing a purifier material comprising elemental carbon that has been conditioned to display hydrophilic properties, and an additional purifier material comprising a nickel fluoride;
   flowing an unpurified fluorine-containing gas having an unpurified moisture concentration over or through the carbon-based purifier material; and
   capturing a portion of the moisture in the purifier material so that a purified fluorine-containing gas that emerges downstream of the purifier material has a reduced moisture concentration that is about 50% or less of the unpurified moisture concentration.

2. The method of claim 1, wherein the carbon-based purifier material comprises microporous charcoal.

3. The method of claim 1, wherein the carbon-based purifier material comprises activated carbon.

4. The method of claim 1, wherein the reduced moisture concentration is about 15% or less of the unpurified moisture concentration.

5. The method of claim 1, wherein the reduced moisture concentration is about 5% or less of the unpurified moisture concentration.

6. The method of claim 1, wherein the fluorine-containing gas comprises hydrogen fluoride.

7. The method of claim 1, wherein the fluorine-containing gas comprises molecular fluorine.

8. The method of claim 1, wherein the fluorine-containing gas is selected from the group consisting of tungsten hexafluoride, silicon tetrafluoride, nitrogen trifluoride, BF3, SiHF3, SiH2F2, SF6, SF4, AsF5, GeF4, GeHF3, PF3, BrF5, BrF3, BrF, C2BrF3, CF4, CF2O, CHClF2, C2ClF5, C2ClF3, CClF3, CBr2F2, C2Br2F4, CCl2F2, CHCl2F, C2Cl2F4, C2H3ClF2, C2H4F2, C2H2F2, CH2F2, C3F6O, C2F6, C2F4, C3F6, IF, IF3, IF5, IF7, CH3F, C4F8, C4F8O, C5F8, F2O, C2H5F, ClFO3, ClF3, ClF5, ClF, C4F10, C3F8, SO2F2, C2F4, N2F4, CCl3F, C2Cl3F3, CHF3, C2H3F, XeF2, SnF4, SnF2, NOF, NClF2, NFCl2, F2O, C3F6O, F2O2S, S2F10, SbF5, UF6, UF4, UF2, MoF6, AsF3, CF3GeI3, CH3GeF3, (CH3)3GeF, (CF3)3GeI, (C2H5)3CF3Si, (CH3)3CF3Si, and halocarbons 116, 1216, 14, 218, 23, 32, 41, 4110, and C318.

9. The method of claim 1, wherein the unpurified moisture concentration is about 1 ppm to about 10,000 ppm.

10. The method of claim 1, wherein the reduced moisture concentration is about 5 ppm or less.

11. The method of claim 1, wherein the method comprises capturing an additional impurity from the unpurified fluorine-containing gas.

12. The method of claim 11, wherein the additional impurity comprises a metal-containing impurity, carbon monoxide, carbon dioxide, or a fluorine-containing hydrocarbon.

13. A method for making a purified fluorine-containing gas, the method comprising:
    contacting an unpurified fluorine-containing gas with a carbon-based purifier material comprising elemental carbon that has been conditioned to display hydrophilic properties, and an additional purifier material comprising a nickel fluoride; and
    capturing a portion of water vapor or a metal-containing impurity in the unpurified gas such that the purified fluorine-containing gas has a water vapor or metal-containing impurity concentration that is about 50% or less than the unpurified gas.

14. The method of claim 13, wherein the elemental carbon comprises microporous charcoal.

15. The method of claim 13, wherein the fluorine-containing gas comprises hydrogen fluoride (HF) or molecular fluorine (F2) gas.

16. The method of claim 13, wherein the method comprises capturing a portion of both the water vapor and the metal-containing impurity in the unpurified gas.

17. The method of claim 13, wherein the metal-containing impurity comprises Na, Mg, Al, P, Ca, Ti, Cr, Fe, Ni, Cu, Zn, Sr, Zr, W, B, or K.

18. The method of claim 13, wherein the metal-containing impurity comprises a volatile metal fluoride or a non-volatile metal fluoride.

19. The method of claim 13, wherein the method further comprises contacting the unpurified hydrogen fluoride or molecular fluorine with additional purifier materials.

20. The method of claim 19, wherein the additional purifier materials comprise an alkali metal fluoride, alkali earth metal fluoride, transition metal fluoride, or aluminum fluoride.

21. The method of claim 13, wherein the nickel fluoride comprises nickel fluoride (NiF2), or potassium hexafluoronickelate (K2NiF6).

22. The method of claim 20, wherein the aluminum fluoride comprises dehydrated aluminum fluoride trihydrate or anhydrous aluminum fluoride.

23. The method of claim 13, wherein the method further comprises capturing one or more additional impurities from hydrogen fluoride or molecular fluorine gas in the carbon-based purifier material.

24. The method of claim 23, wherein the one or more additional impurities comprise hydrogen chloride (HCl), hydrogen bromide (HBr) or boron trichloride (BCl3), carbon monoxide, carbon dioxide, or a fluorine-containing hydrocarbon.

25. A method for making a purified fluorine-containing gas, the method comprising:
    contacting an unpurified fluorine-containing gas with a carbon-based purifier material comprising elemental carbon that has been conditioned to display hydrophilic properties, and an additional purifier material comprising a nickel fluoride; and
    capturing an impurity in the unpurified gas such that the purified fluorine-containing gas has a concentration of the impurity that is about 50% or less than the unpurified gas.

26. The method of claim 25, wherein the fluorine-containing gas comprises hydrogen fluoride (HF) or molecular fluorine (F2) gas.

27. The method of claim 25, wherein the fluorine-containing gas is selected from the group consisting of tungsten hexafluoride, silicon tetrafluoride, nitrogen trifluoride, $BF_3$, $SiHF_3$, $SiH_2F_2$, $SF_6$, $SF_4$, $AsF_5$, $GeF_4$, $GeHF_3$, $PF_3$, $BrF_5$, $BrF_3$, $BrF$, $C_2BrF_3$, $CF_4$, $CF_2O$, $CHClF_2$, $C_2ClF_5$, $C_2ClF_3$, $CClF_3$, $CBr_2F_2$, $C_2Br_2F_4$, $CCl_2F_2$, $CHCl_2F$, $C_2Cl_2F_4$, $C_2H_3ClF_2$, $C_2H_4F_2$, $C_2H_2F_2$, $CH_2F_2$, $C_3F_6O$, $C_2F_6$, $C_2F_4$, $C_3F_6$, $IF$, $IF_3$, $IF_5$, $IF_7$, $CH_3F$, $C_4F_8$, $C_4F_8O$, $C_5F_8$, $F_2O$, $C_2H_5F$, $ClFO_3$, $ClF_3$, $ClF_5$, $ClF$, $C_4F_{10}$, $C_3F_8$, $SO_2F_2$, $C_2F_4$, $N_2F_4$, $CCl_3F$, $C_2Cl_3F_3$, $CHF_3$, $C_2H_3F$, $XeF_2$, $SnF_4$, $SnF_2$, $NOF$, $NClF_2$, $NFCl_2$, $F_2O$, $C_3F_6O$, $F_2O_2S$, $S_2F_{10}$, $SbF_5$, $UF_6$, $UF_4$, $UF_2$, $MoF_6$, $AsF_3$, $CF_3GeI_3$, $CH_3GeF_3$, $(CH_3)_3GeF$, $(CF_3)_3GeI$, $(C_2H_5)_3CF_3Si$, $(CH_3)_3CF_3Si$, and halocarbons 116, 1216, 14, 218, 23, 32, 41, 4110, and C318.

28. The method of claim 25, wherein the impurity comprises moisture or a metal-containing compound.

29. The method of claim 25, wherein the impurity comprises $CF_4$, $C_2F_6$, $SF_6$, $HF$, $SiF_4$, or $CO_2$.

* * * * *